United States Patent
Khan

[19]

[11] Patent Number: 5,825,589
[45] Date of Patent: Oct. 20, 1998

[54] LOW STIFFNESS APPARATUS FOR SUPPORTING A READ/WRITE TRANSDUCER HEAD SLIDER

[75] Inventor: Amanullah Khan, Holden, Mass.

[73] Assignee: Quantum Corporation, Milpitas, Calif.

[21] Appl. No.: 25,902

[22] Filed: Mar. 3, 1993

Related U.S. Application Data

[63] Continuation of Ser. No. 686,729, Apr. 17, 1991, abandoned.

[51] Int. Cl.$^6$ ........................................................ G11B 5/48
[52] U.S. Cl. ................................................................ 360/104
[58] Field of Search .................................... 360/103, 104, 360/105, 106

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,620,251 | 10/1986 | Gitzendanner | 360/103 |
| 4,734,805 | 3/1988 | Yamada et al. | 360/104 |
| 4,783,710 | 11/1988 | Salyer | 360/104 |
| 4,896,233 | 1/1990 | Yamada | 360/104 |
| 4,922,356 | 5/1990 | Yamaguchi et al. | 360/104 |
| 5,006,946 | 4/1991 | Matsuzaki | 360/104 |
| 5,008,768 | 4/1991 | Carlson et al. | 360/104 |
| 5,079,660 | 1/1992 | Yumura et al. | 360/104 |
| 5,138,507 | 8/1992 | Zarouri et al. | 360/104 |
| 5,299,081 | 3/1994 | Hatch et al. | 360/104 |

*Primary Examiner*—Jefferson Evans
*Attorney, Agent, or Firm*—Debra A. Chun; David B. Harrison

[57] ABSTRACT

A low stiffness apparatus supporting a read/write transducer head slider for reduced pitch and roll bias in flying conditions. The apparatus comprises an actuator arm, a load beam, and a flexure in combination. The flexure is comprised of an outer portion, an inner portion, and a bight portion. The bight portion connects the inner portion to the outer portion and provides a one step double bend resulting in a spaced relation between the inner and outer portions along the z-axis. The inner portion also has a dimple formed therein for pivoting against the load beam and is located substantially near the bight. The low stiffness is created from the bight portion and the location of the dimple. The apparatus also prevents the problem of wire overhang, where the wire crashes onto the disc during flying conditions. The apparatus furthermore permits the transducer head slider to move more closely to the hub of the disc, thus allowing the system to read more data.

2 Claims, 6 Drawing Sheets

LOW STIFFNESS APPARATUS FOR SUPPORTING A READ/WRITE TRANSDUCER HEAD SLIDER

This application is a continuation of application Ser. No. 07/686,729, filed Apr. 17, 1991, now abandoned.

CROSS-REFERENCE TO RELATED APPLICATION

Cross-Referenced is the related application of Amanullah Khan, Ser. No. 482,027, filed Feb. 16, 1990, entitled "Head/Gimbal Assembly Having Low Stiffness Cross Band Flexure", relating to a gimbal-type flexure having a lateral cross band support member for flexibly coupling a transducer slider to a load beam on the actuator arm of a disc type data storage drive.

BACKGROUND OF THE INVENTION

The present invention relates to an apparatus for reducing the stiffness in supporting a read/write transducer head slider and for reducing roll and pitch bias in flying.

The technological advancements made in the area of magnetic and optical data storage systems of the disc type in the past few years has been astounding. Not too long ago, the storage system described herein was developed from a phonograph record player, the forefather of today's advanced technology. That system comprised of a head and needle assembly connected to a pivotal arm. The assembly traveled on a rotating record which contained contours whereby a needle detected the information. Presently, we are confronted with heads having magnetic or optical information gathering capabilities rather than the simplistic needle configuration. Problems arise, however, in trying to develop smaller heads s that more discs can be packs closer together. Discs are constantly developed to rotate faster and to provide higher density so as to store and disseminate more information than their predecessors. Thus, we encounter the problem this invention eliminates, namely, the problem of providing a constant air gap between the disc and the slider during operations.

The problem of providing a constant air gap between the transducer and the disc during read/write operations has been one plaguing the magnetic and optical data storage systems for some time. Typically, the air gap is between a few microinches to tens of microinches. The air gap must be wide enough to prevent the transducer from crashing against the disc and close enough to prevent data error due to drop out.

Presently, most of the hard disc manufacturers are using the 3370 type flying head/gimbal assemblies (HGA's). As transducer heads are becoming smaller, their air bearing stiffness in pitch and roll directions decreases. This in turn decreases the ratio of relative stiffness between the air bearing gap and the flexure, therefore, losing compliance while flying. It is important that the head be able to have the flexibility to pitch and roll when reading a disc in order to compensate for the contours and any imperfections that the disc may have, hence to maintain constant separation between the device (carried by the slider) and the magnetic media (disc). Additionally, the 3370 type flexure gimbal became much more stiffer for submini sliders, as submini slider has lower stiffnesses in roll and pitch directions of air bearing. Therefore, any bias or twist in roll and pitch directions from the actuator arm assembly will be conveyed to the slider through the gimbal. The greater the gimbal stiffness, the more bias will be transformed to the slider.

Another problem associated with the prior art is providing an apparatus where the wires connecting the transducer head slider to the actuator arm can be easily bonded onto the transducer without hanging over the transducer, thereby encroaching into the air bearing gap. The problem of wire overhang results in the system being susceptible to head crashing as witnessed by the prior art.

Attention is therefore called to U.S. Pat. Nos. 3,931,641; 4,167,765; 4,620,251; and 4,783,710.

U.S. Pat. No. 3,931,641, entitled "Transducer Suspension Mount Apparatus", issued to Watrous on Jan. 6, 1976 relates to a magnetic head arm assembly having a suspension for an air bearing head slider. The assembly includes a rectangular flexure with two parallel flexible narrow fingers and stiff crosslegs, and a central finger to which the slider is attached. A load beam is fastened to the flexure that engages a load protuberance formed with the central finger whereby flexibility of pitch around a longitudinal axis and roll around an orthogonal axis are provided.

U.S. Pat. No. 4,167,765, entitled "Transducer Suspension Mount Apparatus", issued to Watrous on Sep. 11, 1979 relates to a magnetic head arm assembly having a suspension for an air bearing head slider including a single piece rectangular flexure with two parallel flexible narrow fingers, a stiff crossleg and a central finger to which the slider is attached. A combined load beam-spring element is formed from a single piece and is fastened to the flexure so as to engage a load protuberance formed with the central finger. The triangular load beam/spring element has flanges formed along its length to concentrate a resilient spring action at the opposite end of the flexure while providing a stiffening action along the remaining portion of its length.

U.S. Pat. No. 4,620,251, entitled "Magnetic Transducer Support Structure", issued to Gitzemdamner on Oct. 28, 1986 relates to an apparatus for positioning a magnetic transducer member with respect to a magnetic disk having an actuator which is rotated about an axis and includes an arm having an end secured to the actuator for rotation of the arm about the axis. The apparatus also comprises a gimbal spring that permits the transducer member to move vertically and to pitch and roll as it flies over the rotating surface of the metal disk. The arm, load spring member, and gimbal spring are symmetrical with respect to a straight line running from the axis of rotation of the actuator to the center of the transducer.

U.S. Pat. No. 4,783,710, entitled "Flexure Mount for a Disc Drive Actuator", issued to Salyer, et al. on Nov. 8, 1988 relates to a disc drive having a carriage arm comprising a magnesium head mount and stainless steel flexure. The two pieces are joined where they overlap by a single rivet pressed into a hole at the center line or main axis of the head mount and flexure. The magnesium is free to float on either side of the rivet, thereby alleviating stress and the resulting motion of the flexure.

Wherefore, it is an object of this invention to provide an apparatus that reduces stiffness in pitch and roll bias thereby permitting better compliance and higher resonance frequencies during operation at flying conditions.

Another object is to provide an apparatus that eliminates head crashing caused by wire overhang due to prior bonding techniques.

A still further object of the invention is to provide an apparatus that permits a read/write transducer head to move closer to the disc hub, whereby more information may be transferred during operation.

SUMMARY OF THE INVENTION

According to the invention there is provided a low stiffness apparatus for supporting a read/write transducer head slider for reduced pitch and roll bias in flying conditions. The apparatus comprises an actuator arm, a load beam, and a flexure in combination. The load beam, which is attached to the actuator arm, is configured for acting as a cantilever spring that provides a constant force. The flexure is attached to the load beam along the longitudinal centerline in a plane parallel to the plane of the load beam. The flexure, which substantially provides most of the reduced stiffness is comprised of an outer portion, an inner portion, and a bight portion. The outer portion has formed therein an elongate opening, whereby the inner portion fits within the contour of the opening. The bight portion connects the inner portion to the outer portion and provides a one step double bend resulting in a spaced relation between the inner and outer portions along the z-axis. The inner portion also has a dimple formed therein for pivoting against the load beam. The dimple is located substantially near the bight portion and allows the flexure to pitch and roll about the contact point created by the dimple.

The apparatus reduces stiffness resulting in better flying compliance and higher resonance frequencies. The low stiffness is essentially created from the flexure (the bight portion along with the positioning of the dimple) working in combination with the actuator arm and the load beam. The apparatus also permits the transducer head slider, when mounted onto the flexure, to extend over the flexure, thereby allowing the actuator arm to be connected to the trailing edge and on top of the transducer. This prevents the wire from crashing onto the disc during flying conditions. Finally, the apparatus also permits the transducer head slider to move more closely to the hub of the disc, thus allowing the system to read and write more data.

BRIEF DESCRIPTION OF THE DRAWINGS

The invention will now be described, by way of example, with reference to the accompanying drawings in which.

DETAILED DESCRIPTION OF THE PREFERRED EMBODIMENT

Figure 1:
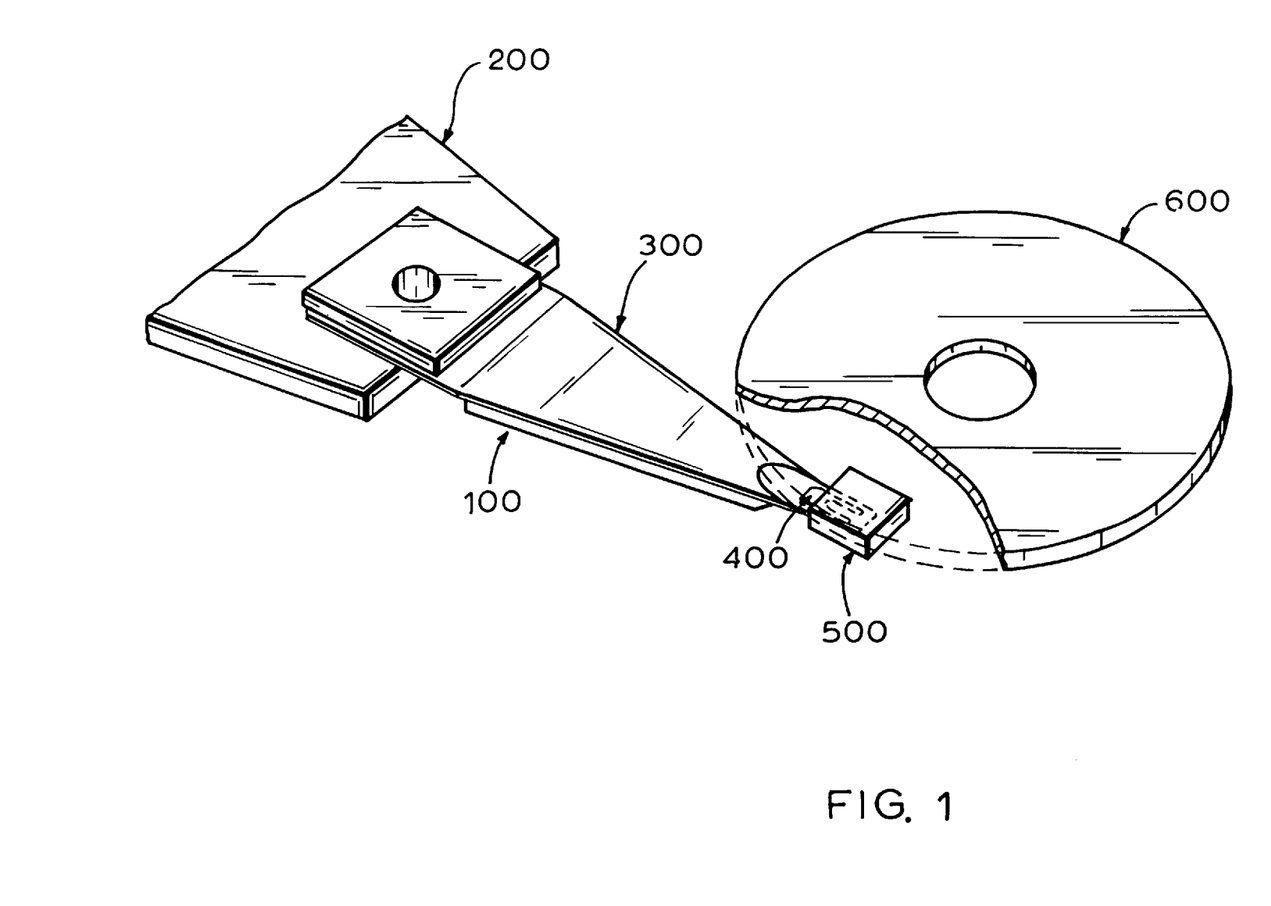
FIG. 1 is an isometric representation of an apparatus for supporting a read/write transducer head slider according to the present invention.

Referring to the drawings, wherein like characters designate like or corresponding parts throughout the views, FIG. 1 depicts a read/write transducer head slider utilized in a magnetic or optical data storage system. The low stiffness apparatus 100 comprises an actuator arm 200, a load beam 300, a flexure 400, a transducer head slider 500, and a disc 600. The assembly, in combination, provides a constant air gap between the transducer and the disc during read/write operations. In FIG. 1, the disk 600 is cut out to reveal the transducer head slider 500. Because the slider 500 follows the contours of the disc 600, it is required that the slider 500 be able to freely follow the disc 600 during operation whereby flexibility is also required. The flexibility is provided by the flexure 400. Due to the design and geometry of this flexure 400, the apparatus 100 is less stiff than prior assemblies. The flexure 400 is fixedly attached to a load beam 300 which in turn is attached to the actuator arm 200. Also shown in FIG. 1, the transducer head slider 500, when mounted, extends beyond the edge of the flexure 400, thereby permitting the slider 500 to move more closely to the hub of the disc 600 and allowing the unit to read more data.

Figure 2:
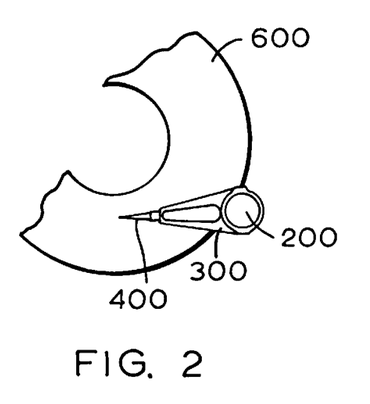
FIG. 2 is a top view of an apparatus as depicted in FIG. 1.
Figure 3:
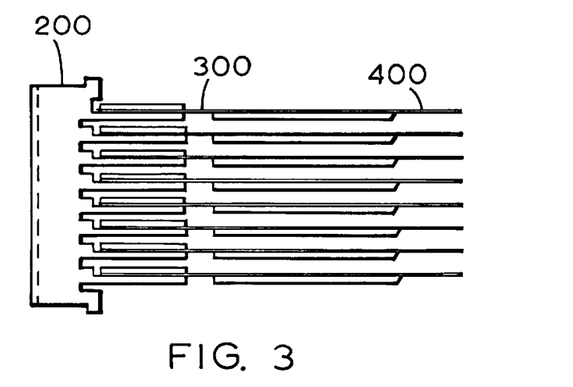
FIG. 3 is a side view of an apparatus as depicted in FIGS. 1 and 2.

FIGS. 2 and 3 show the apparatus while in operation. FIG. 2 depicts a top view of the apparatus and represents a side view of one such apparatus. FIG. 3 depicts the side view of the apparatus and further illustrates multiple assemblies comprising a read/write unit and demonstrates the importance of being able to develop smaller assemblies. The smaller each assembly, the more assemblies in turn may be assembled together, thereby resulting in a greater information gathering and distributing capabilities. FIG. 3 represents eight assemblies in combination.

Figure 4:
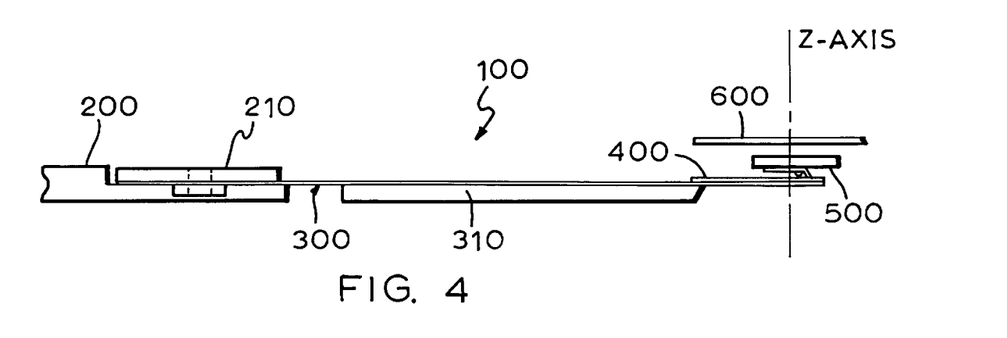
FIG. 4 is a side view of an apparatus representing only one one configuration of the apparatus.

Now turning to FIG. 4, a load beam 300 is fixedly attached at one end to the actuator arm 200 by an actuator fastener 210. Typically, the load beam 300 is attached to the actuator arm 200 by a press fit method. As a result, the load beam 300 acts as a cantilever spring providing a constant force in a direction generally perpendicular to the plane of the disc 600. This direction is along the z-axis. The load beam 300 is strengthened by the load beam support flanges 310. There are two such flanges per load beam, represented in FIG. 5 by 310a and 310b. Attached to the load beam 300 is a flexure 400 fixed to the other end of the load beam 300, along its longitudinal centerline, in a plane substantially parallel to the plane of the load beam 300. The flexure 400 comprises an inner support member and an outer support member in a spaced relation and lying in a plane substantially parallel to each other.

Figure 5:
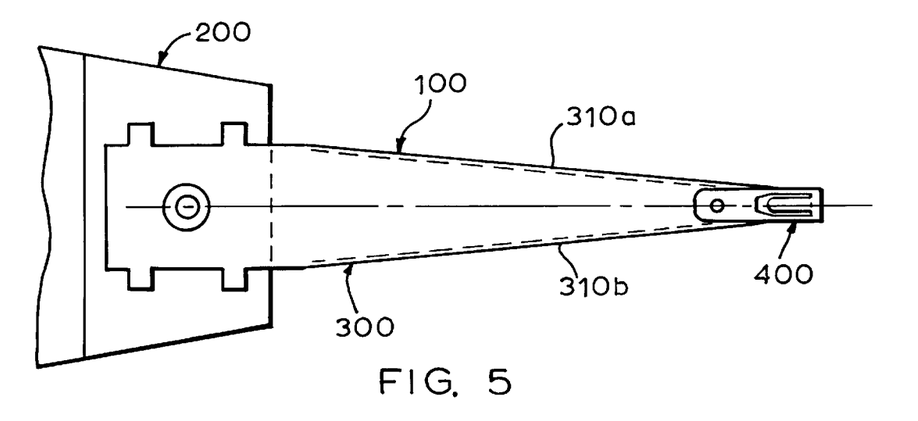
FIG. 5 is a top view of the apparatus.

FIG. 5 depicts more effectively the relative size and actual location of the flexure 400 vis-a-vis the load beam 300. The load beam 300 is substantially larger than the flexure 400. As shown in FIG. 3, multiple assemblies are used in combination to allow for multiple read/write operations. Therefore, the smaller that each component of the apparatus may be developed, the more assemblies may be stacked together. The purpose of the load beam 300 is to provide a force perpendicular to the disc 600, whereas the purpose of the flexure 400 is to provide mobility in the pitch and roll directions as witnessed by FIGS. 12, 13, 14 and 15 representing yaw, bending, torsion and pitching, respectively. The load beam 300 as shown in its present form is substantially rectangular where it attaches to the actuator arm 200 and thereby tapers to the point where the flexure 400 is attached, thus forming a substantially trapezoidal figure. The flexure 400 is attached along the longitudinal centerline of the load beam 300 through its own longitudinal centerline.

Figure 6:
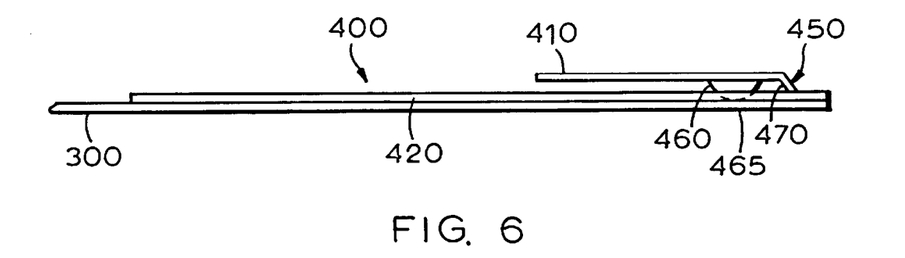
FIG. 6 is a side view of a flexure depicted in the apparatus figures.

Now turning to FIG. 6, it illustrates a flexure 400 comprising an outer support member 420, an inner support member 410, and a bight portion 450. The outer member 420 is attached to the load beam 300 along the load beam's and its' own longitudinal centerline opposite of where the load beam attaches to the actuator arm 200. The outer member 420 is generally planar and generally rectangular in shape. The integrally attached inner member 410 utilizes the bight portion 450 to interconnect one end of the inner member 410 to the outer member 420. The inner portion 410 is configured to receive a transducer head slider 500. The inner member 410 lies in a plane substantially parallel to the plane of the outer member 420. The bight portion 450 is formed to provide a one step double bend resulting in a spaced relation between the inner and outer members (410 and 420). This bend forms an angle 470 between the bight portion 450 and outer support member 420. There is further provided a dimple 460 formed on the inner portion 410 for pivoting against the load beam 300. The dimple 460 is a semispherical formation that allows the flexure 400 to pitch and roll about a contact point 465 between the dimple 460 and the load beam 300. As represented in FIG. 6, the dimple 460 is positioned on the inner portion 410 substantially near the bight 450. Essentially, it is the flexure's bight portion 450 and the relative location of the dimple to the bight which provides the reduced stiffness thereby resulting in the slider being able to pitch and roll about the contact point 465 between the flexure 400 and the load beam 300.

Figure 12:
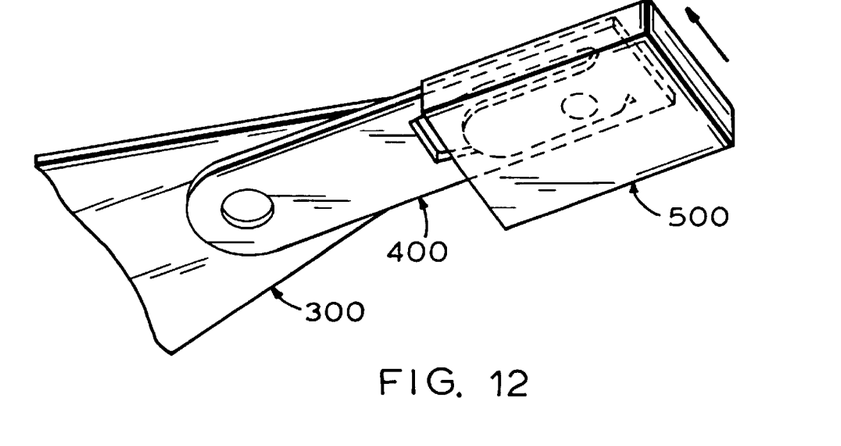
FIGS. 12, 13, and 14 are flexures according to the present invention with their associated sliders shown in different modes of vibration.
Figure 13:
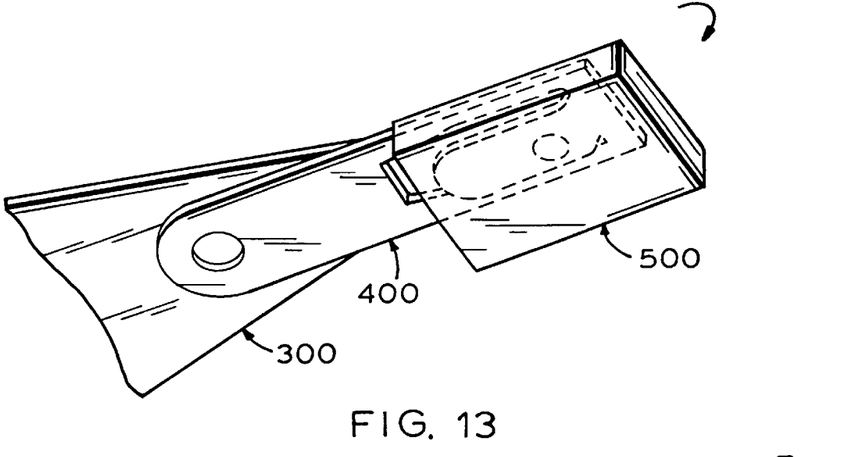
Figure 14:
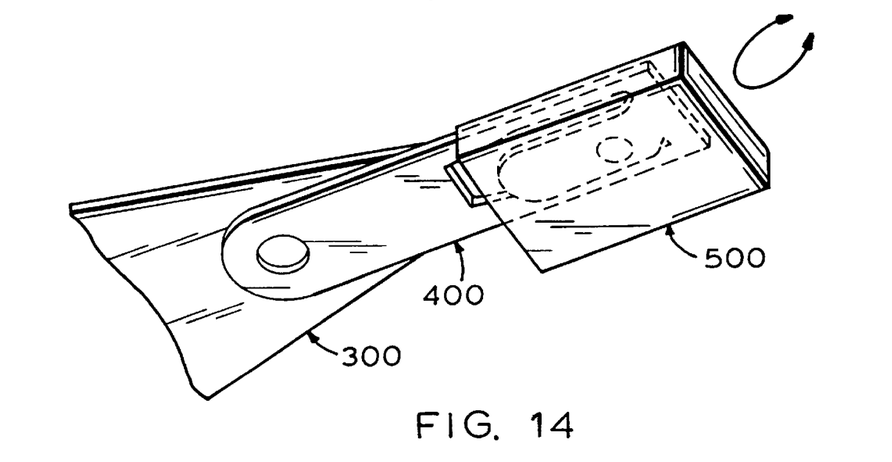

FIGS. 12, 13, and 14 show different resonance modes of the load beam 300, flexure 400 and transducer head slider 500, which represent yaw, bending, torsion, and pitching, respectively. Reducing pitch stiffness tends to decouple z-height variation error by reducing pitch caused by slider position with relation to the disc. Also reducing roll stiffness causes the slider to decouple roll imposed by the assembly on the slider, hence reducing the roll and the flying hight variation of the slider.

Figure 7:
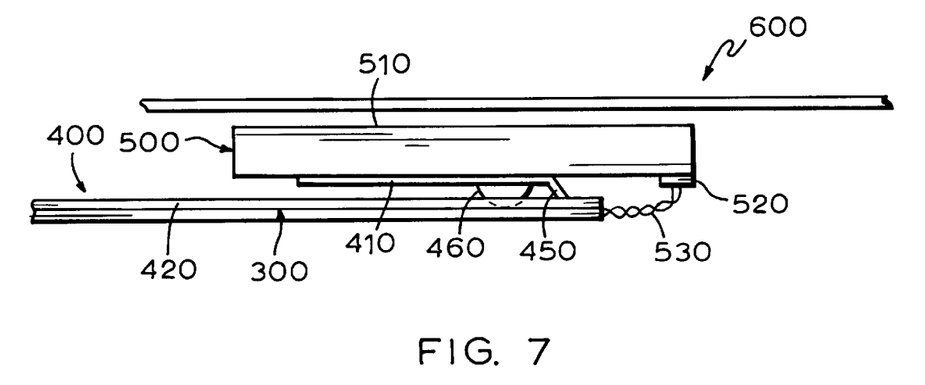
FIG. 7 is a side view of a flexure in combination with a transducer head slider depicted in the apparatus figures.
Figure 8:
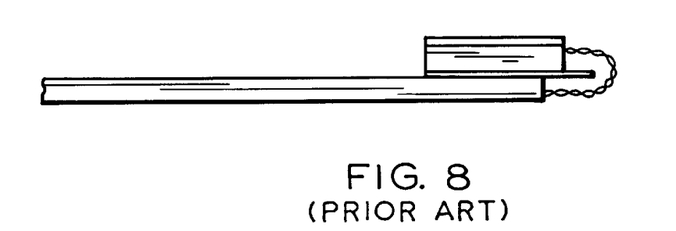
FIG. 8 is a representation of the wire attachment as witnessed in the prior art.

FIG. 7 represents the same flexure 400 as in FIG. 6 receiving a transducer head slider 500. The transducer head slider 500 is bonded to the flexure 400 on the substantially planar surface of the inner portion 410 on the dimple 460 thereby allowing the flexure 400 to pitch and roll about the contact point 465. Further illustrated are bonding pads 520 located on the back side of the transducer head slider 500, opposite of the air bearing surface 510. Extending from the bonding pads 520 are information transmission wires 530. Quickly turning to FIG. 8, FIG. 8 represents the prior art of connecting the transducer head slider 500 to the load beam 300. Apparent is the problem of wire overhang. The problem stems from the flexure extending over the load beam an the slider centrally locate as witnessed in FIG. 8. Because the wire in FIG. 8 attaches the side portion of the slider and must extend over the flexure to be connected to the load beam, there is a strong potential that the information transmission wire will crash onto the disc. The present invention overcomes this problem as depicted in FIG. 7 by attaching the flexure 400 onto the load beam 300 so that the load beam's free end and the end of the flexure are flush. Thereupon the transducer head slider 500 is positioned onto the flexure 400 so to permit the slider 500 to extend beyond the ends of said flexure 400 and load beam 300. Therefore, the bonding pads 520 are located on the back side of the slider 500 (as opposed to the side of the slider) away from the air bearing surface 510 whereby the information transmission wire 530 may directly connect the bonding pads 520 to the load beam 300 without having to extend over the flexure.

Figure 11:
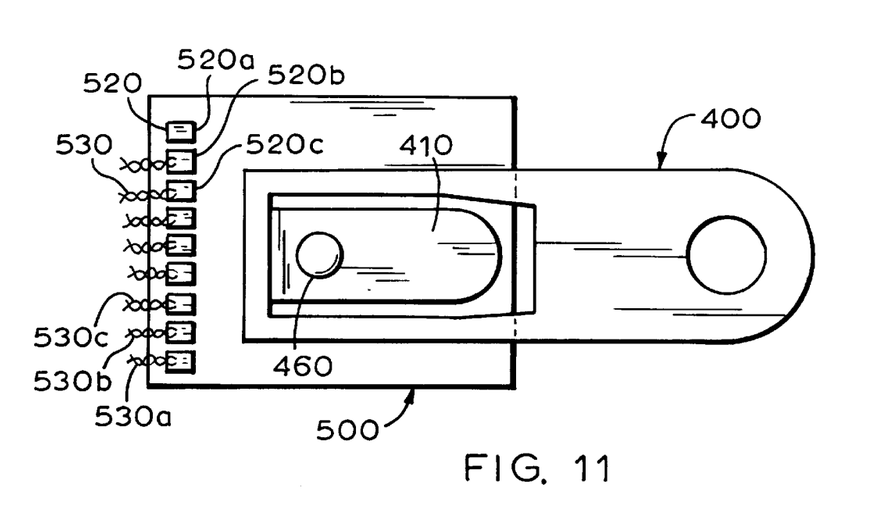
FIG. 11 is a perspective view of a flexure in combination with a transducer head slider where the bonding area and wire connections are exposed.

FIG. 11 is a perspective view of the apparatus represented in FIG. 7. This view illustrates the flexure 400 in combination with a transducer head slider 500 where the bonding pads 520 and wire connections 530 are exposed. Clearly represented are the bonding pads 520*a*, 520*b*, and 520*c* along with information transmission wires 530*a*, 530*b*, and 530*c*.

Figure 9:
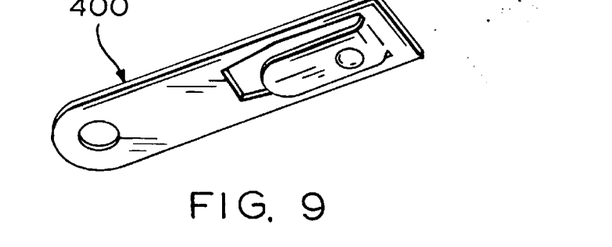
FIG. 9 is an isometric representation of a flexure.
Figure 10:
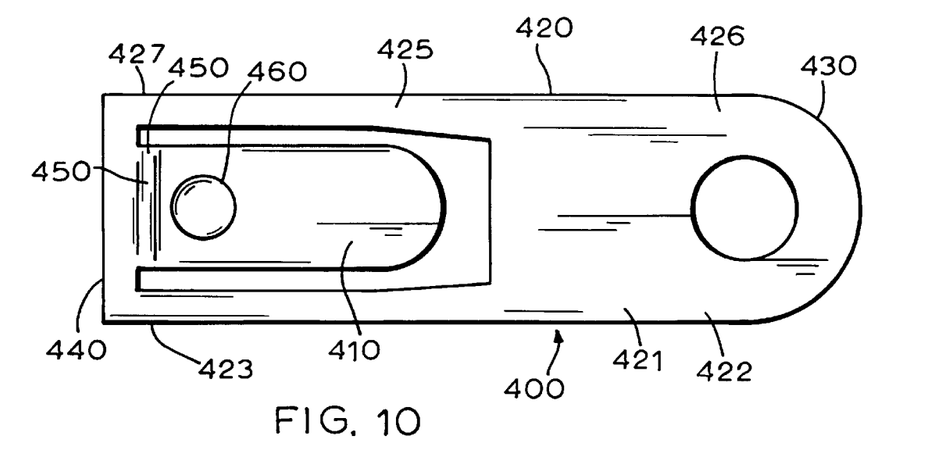
FIG. 10 is a top view of a flexure represented in FIG. 9.

FIG. 9 is an isometric representation of the flexure 400. FIG. 10 represents a unitary flexure 400 for attachment to a load beam and for supporting a transducer head slider as described. The flexure comprises a generally elongate outer member 420 having a load beam attachment end 430 and a free end 440. There is an elongated opening formed therein which is substantially rectangular. The outer member 420 is further configured to provide for two opposed generally parallel long edges 421 and 425 having a given space between them. The flexure additionally comprises an inner support member 410 configured for receiving a transducer head slider by having a generally planar surface. The perimeter of the inner support member 410 is dimensionally configured for fitting within the dimensions of the elongate opening located in the outer support member 420. Located within the inner support member 410 is a semi-sphereical dimple 460 formed on the longitudinal centerline of said inner support member 410. The dimple 460 is located in a proximate relation close to the bight portion and protrudes toward the outer portion 420 which allows the dimple to pivot against the load beam 300. There is further provided in said flexure 400 a bight portion 450 which interconnects one end of the inner support member 410 to an edge of the elongate opening adjacent to the free end 440 of the outer support member 420.

Figure 15:
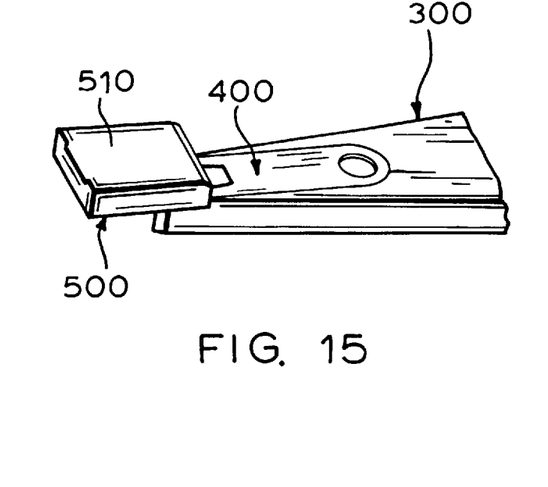
FIG. 15 is an isometric representation of an HGA.
Figure 16:
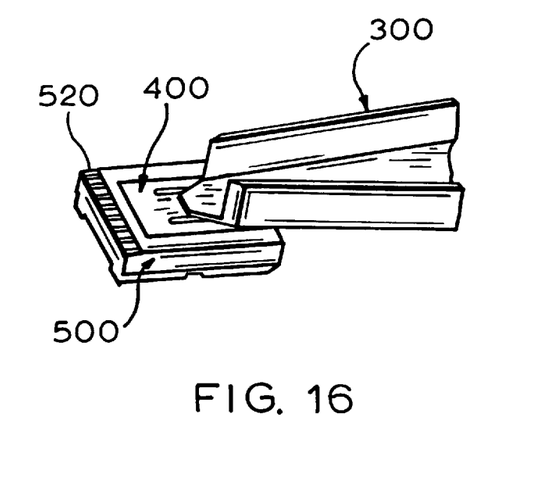
FIG. 16 is an isometric representation of the HGA as shown in FIG. 15 taken from the bottom view.

Lastly, FIGS. 15 and 16 are isometric representations of the HGA taken from top and bottom views. In contrast with the size of the figures depicting the apparatus, in its preferred embodiment, the items discussed up to this point are extremely small in size. For example, the flexure 400 is 0.31 inches in length. Additionally, the load beam 300 is approximately 1 inch long. The smaller a component is, the more stiff the apparatus becomes. This invention recognizes importance of compactness and the related desire to develop a low stiffness apparatus by developing an apparatus which addresses these concerns.

Since certain changes may be made in the above device without departing from the spirit and scope of the invention herein involved, it is intended that all matter contained in the above description and shown in the accompanying drawings shall be interpreted as being illustrative and not limiting.

I claim:

1. A unitary flexure for attachment to a load beam and for supporting a transducer head slider, said flexure comprising:

a generally planar generally elongated first member having a load beam attachment end, a free end, and an elongated opeining formed therein, said opening having opposed, spaced, generally parallel long edges;

a second member configured to receive the transducer head slider, said second member disposed within the dimensions of said opening;

a bight portion being disposed to provide a one step double bend, said one step double bend disposed such that the bend axes are substantially perpendicular to the longitudinal axis of said second member, said bight portion interconnecting a first end of said second member to an edge of said opening adjacent said free end of said first member resulting in said second member being spaced from said first member, and said second member lying in a plane substantially parallel to the plane of the first member;

a dimple disposed on a longitudinal centerline of said second member in proximate relation to said bight portion and distal relative to the center of said second member, said dimple protruding toward said first member to allow said dimple to pivot against a load beam attached to the unitary flexure; and a transducer head slider mounted on said unitary flexure to extend over said free end of said flexure along said longitudinal axis of said second member, wherein such positioning of the transducer head slider allows said actuator arm to be connected by wire to the top of said transducer head slider to prevent the wire from crashing onto a disc.

2. A unitary flexure for attachment to a load beam and for supporting a transducer head slider, said flexure comprising:

a generally planar generally elongated first member having a load beam attachment end, a free end, and an elongated opeining formed therein, said opening having opposed, spaced, generally parallel long edges;

a second member configured to receive the transducer head slider, said second member disposed within the dimensions of said opening;

a bight portion being disposed to provide a one step double bend, said one step double bend disposed such that the bend axes are substantially perpendicular to the longitudinal axis of said second member, said bight portion interconnecting a first end of said second member to an edge of said opening adjacent said free end of said first member resulting in said second member being spaced from said first member, and said second member lying in a plane substantially parallel to the plane of the first member;

a dimple disposed on a longitudinal centerline of said second member in proximate relation to said bight portion and distal relative to the center of said second member, said dimple protruding toward said first member to allow said dimple to pivot against a load beam attached to the unitary flexure; and a transducer head slider mounted on said unitary flexure to extend beyond said free end of said flexure along said longitudinal axis of said second member, wherein such positioning of the transducer head slider permits said transducer head slider to move more closely to a hub of a disc to allow said unitary flexure to access more data.

* * * * *